(12) United States Patent
Melton et al.

(10) Patent No.: US 6,579,014 B2
(45) Date of Patent: Jun. 17, 2003

(54) FIBER OPTIC RECEPTACLE

(75) Inventors: Stuart R. Melton, Hickory, NC (US); Darrell R. Childers, Hickory, NC (US); Hieu V. Tran, Charlotte, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/967,252

(22) Filed: Sep. 28, 2001

(65) Prior Publication Data

US 2003/0063866 A1 Apr. 3, 2003

(51) Int. Cl.[7] ................................................. G02B 6/36
(52) U.S. Cl. ........................... 385/76; 385/77; 385/55; 385/84
(58) Field of Search ............................ 385/78, 84, 77, 385/55, 70, 72, 76

(56) References Cited

U.S. PATENT DOCUMENTS

| | | | | |
|---|---|---|---|---|
| 5,751,874 A | * | 5/1998 | Chudoba | 385/72 |
| 5,778,122 A | * | 7/1998 | Giebel | 385/55 |
| 5,887,095 A | * | 3/1999 | Nagase | 385/58 |
| 5,993,071 A | * | 11/1999 | Hultermans | 385/70 |

\* cited by examiner

*Primary Examiner*—John Juba
*Assistant Examiner*—Leo Boutsikaris

(57) ABSTRACT

A fiber optic receptacle is provided that includes a receptacle housing and an adapter sleeve disposed therewithin and biased toward a first end of the receptacle housing through which a fiber optic plug is inserted. In an embodiment, the fiber optic receptacle includes the adapter sleeve is biased toward a first end of the receptacle housing through which a fiber optic plug is inserted in order to maintain physical contact between front faces of the plug ferrule and the receptacle ferrule without requiring that the fiber optic connector of the fiber optic plug be latched to the adapter sleeve, thereby increasing the float between the respective ferrules. In another embodiment, a fiber optic plug and receptacle assembly is provided in which either the plug or the receptacle includes an alignment stop while the other one includes an alignment feature and a stop feature to ensure alignment of the plug and receptacle and to limit insertion of the plug within the receptacle. A universal receptacle is also provided that defines an internal cavity sized to receive any one of an adapter sleeve configured to receive a plurality of connector types including MTP, MTRJ, SC-DC, SC, DC, Unicam™, LC, and the like.

33 Claims, 5 Drawing Sheets

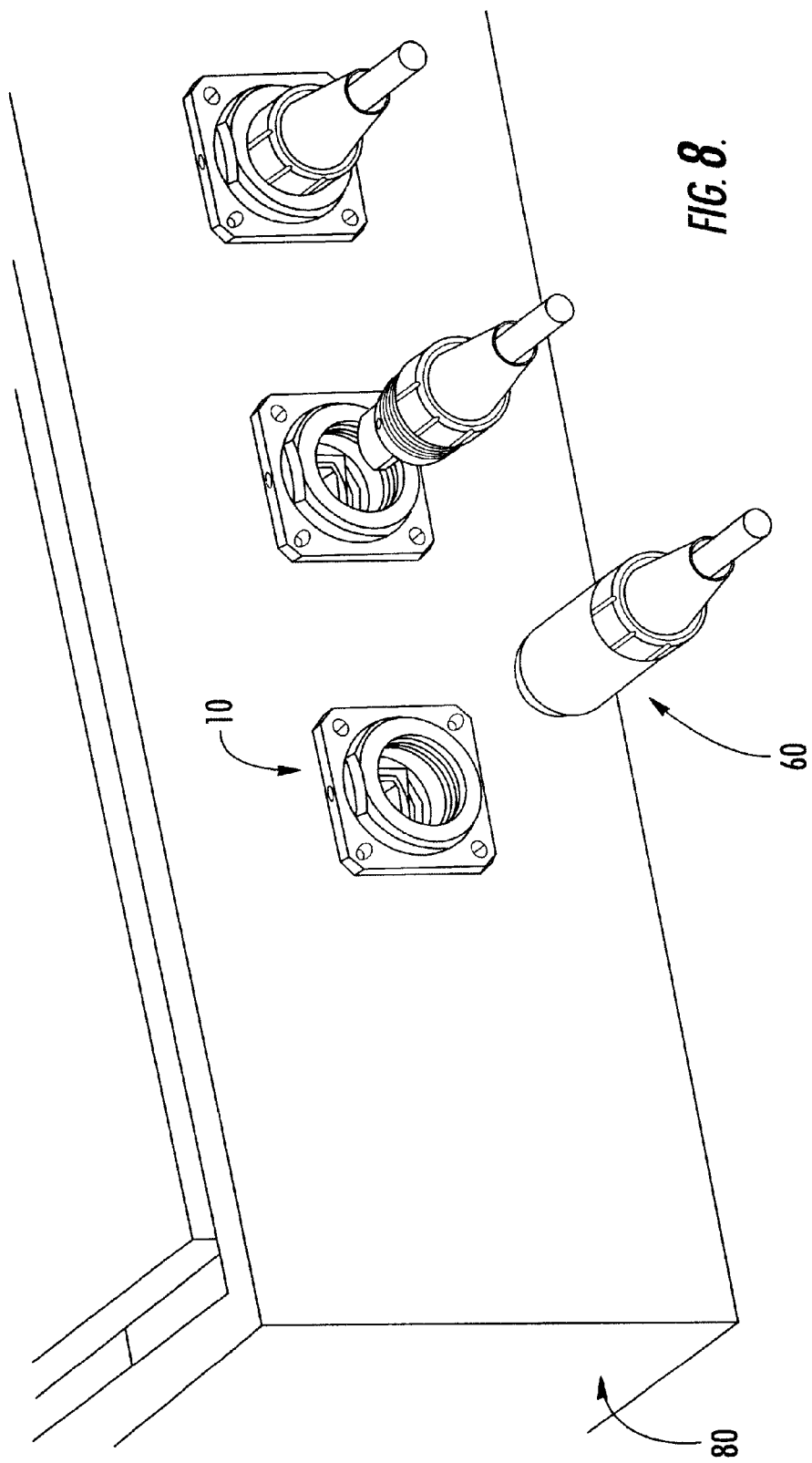

of the invention, the fiber optic receptacle
FIBER OPTIC RECEPTACLE

FIELD OF THE INVENTION

The present invention relates generally to assemblies for interconnecting or otherwise terminating optical fibers, and, more particularly, to receptacles for receiving corresponding fiber optic plugs.

BACKGROUND OF THE INVENTION

Optical fibers are used in an increasing number and variety of applications, such as a wide variety of telecommunications and data transmission applications. As a result, fiber optic networks must include an ever increasing number of enclosures in which one or more of the optical fibers are interconnected or otherwise terminated. For example, fiber optic networks, such as cable television (CATV) networks, may include a number of optical network units (ONUs) in which the optical signals propagating along the optical fibers are converted to respective electrical signals. In addition, telephone and CATV networks can include a number of network interface devices (NIDs); each NID is associated with a particular subscriber. Upon receiving the incoming optical signals, the NID splits and routes the signals to predetermined locations, such as to various telephone or CATV outlets. Like an ONU, the NID can also convert the incoming optical signals to electrical signals, if necessary. Fiber optic networks can also include a number of other closures, including splice closures, in which various ones of the optical fibers are spliced or optically connected. Regardless of the type, these enclosures provide protection, such as from moisture or other forms of environmental degradation, for the optical fibers and, more particularly, the point at which the optical fibers are spliced or are otherwise optically connected.

These enclosures, such as ONUs, NIDs, and other closures, typically include one or more receptacles in which the individual optical fibers of a fiber optic cable are connected to respective optical fibers within the enclosure. The optical fibers within the enclosure can then be interconnected or otherwise terminated as desired. Conventionally, receptacles have included a receptacle housing defining an internal cavity and an adapter sleeve disposed in a fixed position within the internal cavity defined by the receptacle housing. The adapter sleeve is designed to receive a pair of ferrules, each of which is mounted upon the end portions of a plurality of optical fibers. One of the ferrules is attached to the end of optical fibers extending from a cable, ribbon, or optical fiber device that extends into or is located in the interior of the enclosure to facilitate splicing or other interconnection or termination of the optical fibers. As described below, the other ferrule is mounted upon optical fibers extending from a cable, ribbon, or optical fiber device that extends outside or is located outside of the enclosure, such as the optical fibers of a fiber optic cable. The adapter sleeve assents in gross alignment of the ferrules, and ferrule guide pins or other alignment means assent in detailed alignment of the optical fibers mounted on the end faces of each ferrule.

In order to mate with the receptacle of a conventional enclosure, a fiber optic plug is mounted upon the end portion of a fiber optic cable. Typically, the plug includes a generally cylindrical plug body and a fiber optic connector including a plug ferrule disposed within the cylindrical plug body. In order to protect the plug ferrule, the cylindrical plug body may partially or completely surround the lateral sides of the fiber optic connector. While the end of the cylindrical plug body is open such that the ferrule is accessible, the end of the cylindrical plug body does extend slightly beyond the ferrule to provide further protection. The ferrule is mounted upon a plurality of optical fibers of the fiber optic cable such that mating of the plug and the receptacle will align or connect the optical fibers of the fiber optic cable with respective optical fibers within the enclosure.

In the process of mating the plug and the receptacle, the plug ferrule is inserted into one end of the adapter sleeve of the receptacle. The adapter sleeve therefore aligns the plug ferrule with a receptacle ferrule that is attached to the end portions of optical fibers from a cable, ribbon, or optical fiber device that extends into or is located in the interior of the enclosure. As a result of the construction of a conventional fiber optic plug, one end of the adapter sleeve is received within the open end of the plug body as the plug ferrule is inserted into the adapter sleeve. In addition, in order to retain the plug ferrule within the adapter sleeve, the fiber optic connector of the fiber optic plug and the adapter sleeve are designed to be mechanically coupled, such as by means of a pair of latches. While the latches effectively couple the plug ferrule and the adapter sleeve, the mechanical coupling of the fiber optic connector and the adapter sleeve disadvantageously limit float between the plug ferrule and the adapter sleeve.

Several different types of conventional fiber optic connectors have been developed. Examples of some well-known connectors include an MTP connector, an MTRJ connector, an SC-DC connector, a Unicam™ connector, an SC connector, a DC connector, and an LC connector. The size, shape, and latching mechanism of each of these conventional connectors are somewhat different. Correspondingly, the size and shape of the adapter sleeve of the fiber optic receptacle designed to receive a fiber optic connector, including the above-mentioned different types of conventional connectors, are also different. As such, according to conventional practice, different fiber optic receptacles are generally utilized in conjunction with the different types of fiber optic connectors. In this regard, the fiber optic receptacles generally define differently sized internal cavities corresponding to the sizes of the adapter sleeve and, in turn, according to a ferrule of the fiber optic connector to be inserted within the adapter sleeve. Accordingly, a technician typically has to maintain several different types of fiber optic receptacles in inventory so that the proper type of fiber optic receptacle can be installed depending upon the type of fiber optic connector to be inserted into the receptacle. As will be apparent, maintaining a number of different types of fiber optic receptacles in inventory is not only somewhat cumbersome for the technician, but also increases the overall costs associated with the inventory.

SUMMARY OF THE INVENTION

An improved fiber optic receptacle is therefore provided according to this invention that addresses many of the shortcomings of conventional fiber optic receptacles. In one embodiment of this invention, the fiber optic receptacle includes an adapter sleeve for receiving and aligning a plurality of connector types wherein the adapter sleeve defines a lengthwise longitudinally extending passageway through opposed first and second ends, a receptacle housing comprising an interior surface and an exterior surface, and a bias member disposed within the receptacle housing. The adapter sleeve has a first end that is adapted to receive a plug ferrule of a fiber optic connector contained or partially contained within a fiber optic plug and a second end is adapted to receive a receptacle ferrule from a second fiber optic connector, optical device, or the like. Further, the receptacle housing includes opposed first end and second end, wherein the first end of the receptacle housing is adapted to receive the adapter sleeve and wherein the second end of the receptacle housing is adapted to receive the receptacle ferrule. Still further, the bias member operably engages the adapter sleeve so as to urge the adapter sleeve towards the first end of the receptacle housing, and, thereby the bias member is configured to floatingly align the plug ferrule with the receptacle ferrule engaged in the adapter sleeve.

Typically, the receptacle provides access to an enclosure or the like such that optical fibers extending from a fiber optic cable may be aligned with and optically interconnected with optical fibers within an enclosure or the like. In an embodiment, the fiber optic receptacle includes an adapter sleeve that is biased toward a first end of the receptacle housing through which a fiber optic plug is inserted in order to maintain physical contact between front faces of the plug ferrule and the receptacle ferrule without requiring that the fiber optic connector of the fiber optic plug be latched to the adapter sleeve, thereby increasing the float between the respective ferrules. According to an embodiment, a fiber optic plug and fiber optic receptacle assembly is provided in which one of the fiber optic plug and the fiber optic receptacle includes an alignment stop and the other one of the fiber optic plug and the fiber optic receptacle includes an alignment feature and a stop feature to ensure alignment of the fiber optic plug and the fiber optic receptacle and to limit insertion, i.e., to prevent overinsertion, of the fiber optic plug within the fiber optic receptacle. According to a further embodiment, a universal fiber optic receptacle is provided in which an internal cavity defined by the receptacle housing and the associated adapter retainer is sized to receive any adapter sleeve, such as, for example, adapter sleeves configured to receive a plurality of connector types including MTP, MTRJ, SC-DC, SC, DC, Unicam™, LC, and the like.

In an embodiment, a fiber optic receptacle is provided that includes a receptacle housing defining an internal cavity opening through opposed first end and second end. The fiber optic receptacle also includes an adapter sleeve disposed within the internal cavity defined by the receptacle housing. The adapter sleeve defines a lengthwise extending passage opening through opposed first end and second end for receiving and aligning the plug ferrule and the receptacle ferrule. In this embodiment, the fiber optic receptacle also includes a bias member disposed within the receptacle housing. The bias member operably engages the adapter sleeve and urges the adapter sleeve toward the first end of the receptacle housing. By urging the adapter sleeve toward the first end of the receptacle housing, the front faces of the plug ferrule and the receptacle ferrule are maintained in contact without having to latch the plug ferrule of the fiber optic plug to the adapter sleeve. As such, physical contact can be maintained between the front faces of the plug ferrule and the receptacle ferrule while permitting the ferrules to float.

In an embodiment, the bias member includes at least one spring disposed between the second end of the receptacle housing and the adapter sleeve. The receptacle housing of this embodiment can also include at least one post extending in a lengthwise direction from the second end. As such, each spring can be mounted upon a respective post.

The adapter sleeve preferably includes a sleeve member that extends lengthwise between opposed first end and second end. According to an embodiment, the second end of the sleeve member includes means for mechanically engaging a receptacle ferrule, such as, for example, a pair of latches. However, the first end of the sleeve member is preferably free of latches with the plug ferrule being held within the first end of the adapter sleeve by the spring loading of the adapter sleeve. The adapter sleeve can also include a pair of wings extending from opposite sides of the sleeve member. The pair of wings are engaged by the bias member to urge the adapter sleeve toward the first end of the receptacle housing.

The fiber optic receptacle can also include an adapter retainer connected to the receptacle housing proximate the first end thereof. The adapter retainer engages the adapter sleeve so as to retain the adapter sleeve within the receptacle housing.

In another embodiment, a fiber optic plug and fiber optic receptacle assembly is provided that facilitates the alignment of the fiber optic plug and the fiber optic receptacle and that limits the insertion of the fiber optic plug into the fiber optic receptacle, thereby preventing overinsertion. According to this embodiment, a fiber optic plug includes a plug body and a fiber optic connector disposed within the plug body. The fiber optic connector, in turn, includes a connector housing and a plug ferrule that is partially disposed within the connector housing. For mating with the fiber optic plug, the fiber optic receptacle includes a receptacle housing defining an internal cavity opening through both the opposed first end and second end and an adapter sleeve disposed within the internal cavity. The adapter sleeve defines a lengthwise extending passage for receiving a portion of the plug ferrule of the fiber optic plug. According to this embodiment, one of the fiber optic plug and the fiber optic receptacle includes an alignment stop, while the other one of the fiber optic plug and the fiber optic receptacle includes an alignment feature and a stop feature. The alignment stop engages the alignment feature to ensure alignment of the fiber optic plug and the fiber optic receptacle. In addition, the alignment stop is also adapted to contact the stop feature to thereby limit insertion of the fiber optic plug within the fiber optic receptacle. As such, the fiber optic plug and fiber optic receptacle assembly prevents overinsertion of the fiber optic plug into the fiber optic receptacle.

According to another embodiment, the fiber optic receptacle includes the alignment stop that is disposed in a fixed position within the receptacle housing. Correspondingly, the fiber optic plug of this embodiment includes the alignment feature and the stop feature. Thus, the alignment stop of the fiber optic receptacle can engage the alignment feature of the fiber optic plug to ensure alignment of the fiber optic plug and the fiber optic receptacle. In addition, the alignment stop of the fiber optic receptacle can contact the stop feature of the fiber optic plug to limit insertion of the fiber optic plug within the fiber optic receptacle.

The alignment stop can include a pin and the alignment feature can include a groove with a closed end for engaging a distal end of the pin in order to serve as the stop feature. In the embodiment that includes the pin, the pin has a predetermined length and extends alongside at least a portion of the adapter sleeve from a proximate end connected to the second end of the receptacle housing to the opposed distal end. The plug body of the fiber optic plug of this embodiment defines the groove for receiving the pin. Both the pin and the corresponding groove preferably extend in a lengthwise direction. In this regard, the plug body typically includes a first end adapted to be inserted into the fiber optic receptacle. As such, the groove defined by the plug body extends from an open end proximate the first end of the plug body to an opposed closed end that serves as the stop feature.

Regardless of which component includes the alignment stop and the corresponding alignment feature and stop feature, the alignment stop facilitates the alignment of the fiber optic plug and the fiber optic receptacle and prevents overinsertion of the fiber optic plug into the fiber optic receptacle that could otherwise damage the fiber optic plug and the fiber optic receptacle.

According to another embodiment, a universal fiber optic receptacle is provided. The universal fiber optic receptacle includes a receptacle housing extending lengthwise between opposed first end and second end and an adapter retainer connected to the receptacle housing proximate the first end thereof. The adapter retainer and the receptacle housing cooperate to define an internal cavity sized to receive any one of an adapter retainer sized to receive any adapter sleeve, such as, for example, adapter sleeves configured to receive a plurality of connector types including MTP, MTRJ, SC-DC, SC, DC, Unicam™, LC, and the like. The universal fiber optic receptacle of this embodiment also includes an adapter sleeve disposed within the internal cavity defined by the adapter retainer and the receptacle housing, including, for example adapter sleeves configured to receive a plurality of connector types including MTP, MTRJ, SC-DC, SC, DC, Unicam™, LC, and the like. The adapter sleeve defines the lengthwise extending passage opening through the opposed first and second ends for receiving and aligning the plug ferrule and the receptacle ferrule. In an embodiment, the adapter retainer is threadably connected to the receptacle housing such that the adapter retainer is capable of being disconnected from the receptacle housing in order to access the adapter sleeve, such as to clean the adapter sleeve or the receptacle ferrule or to remove the current adapter sleeve and to insert a different type of adapter sleeve into the universal fiber optic receptacle. The universal fiber optic receptacle can also include a seal disposed between the adapter retainer and the receptacle housing. As such, a common receptacle can be utilized for a wide variety of applications that utilize different types of connectors, thereby reducing the number of different types of receptacles that must be manufactured and maintained in inventory.

BRIEF DESCRIPTION OF THE DRAWINGS

Figure 1:
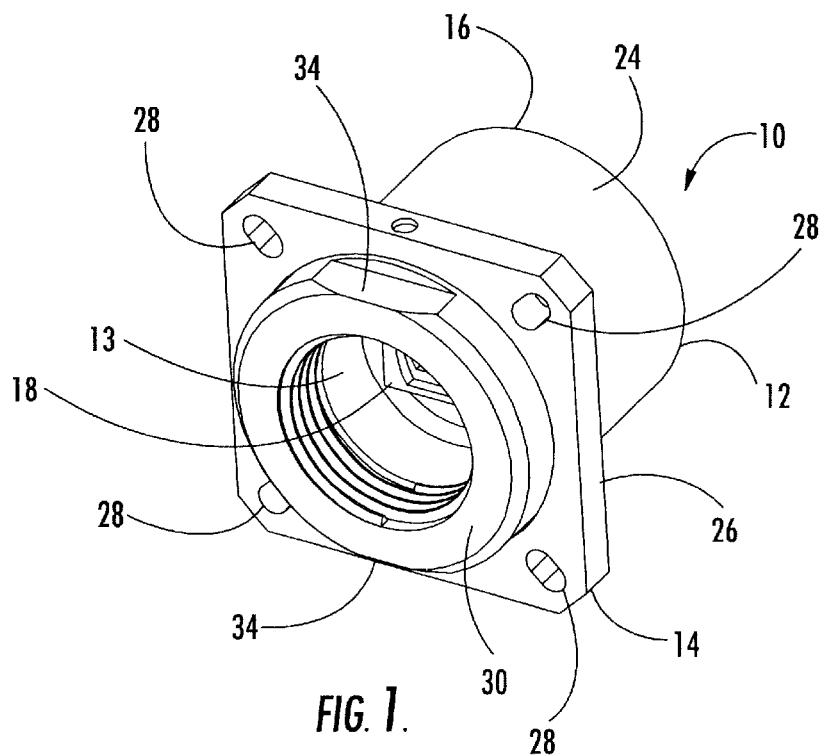
Figure 2:
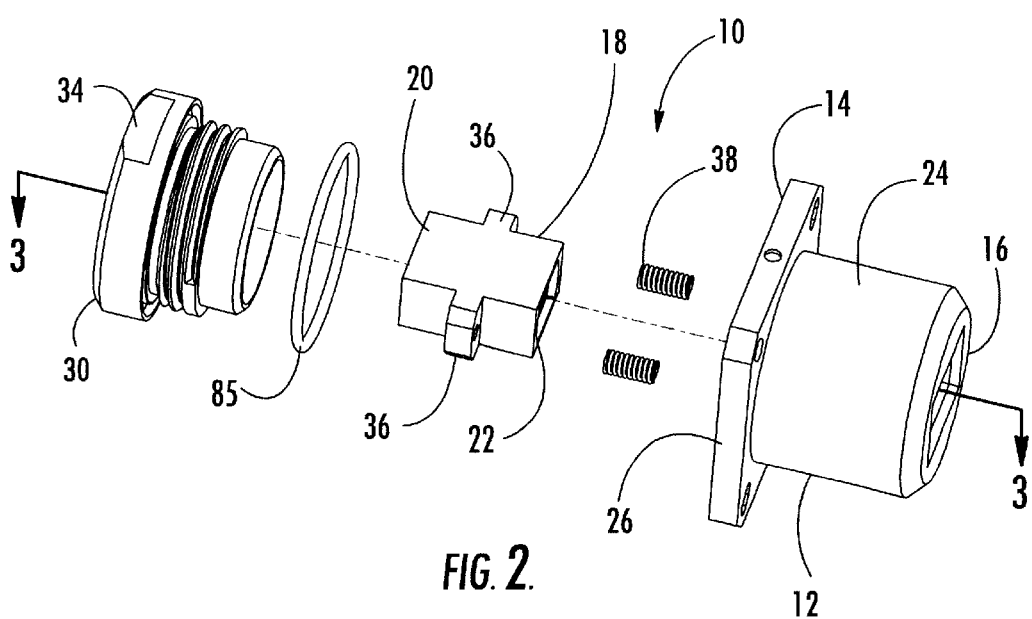
Figure 3:
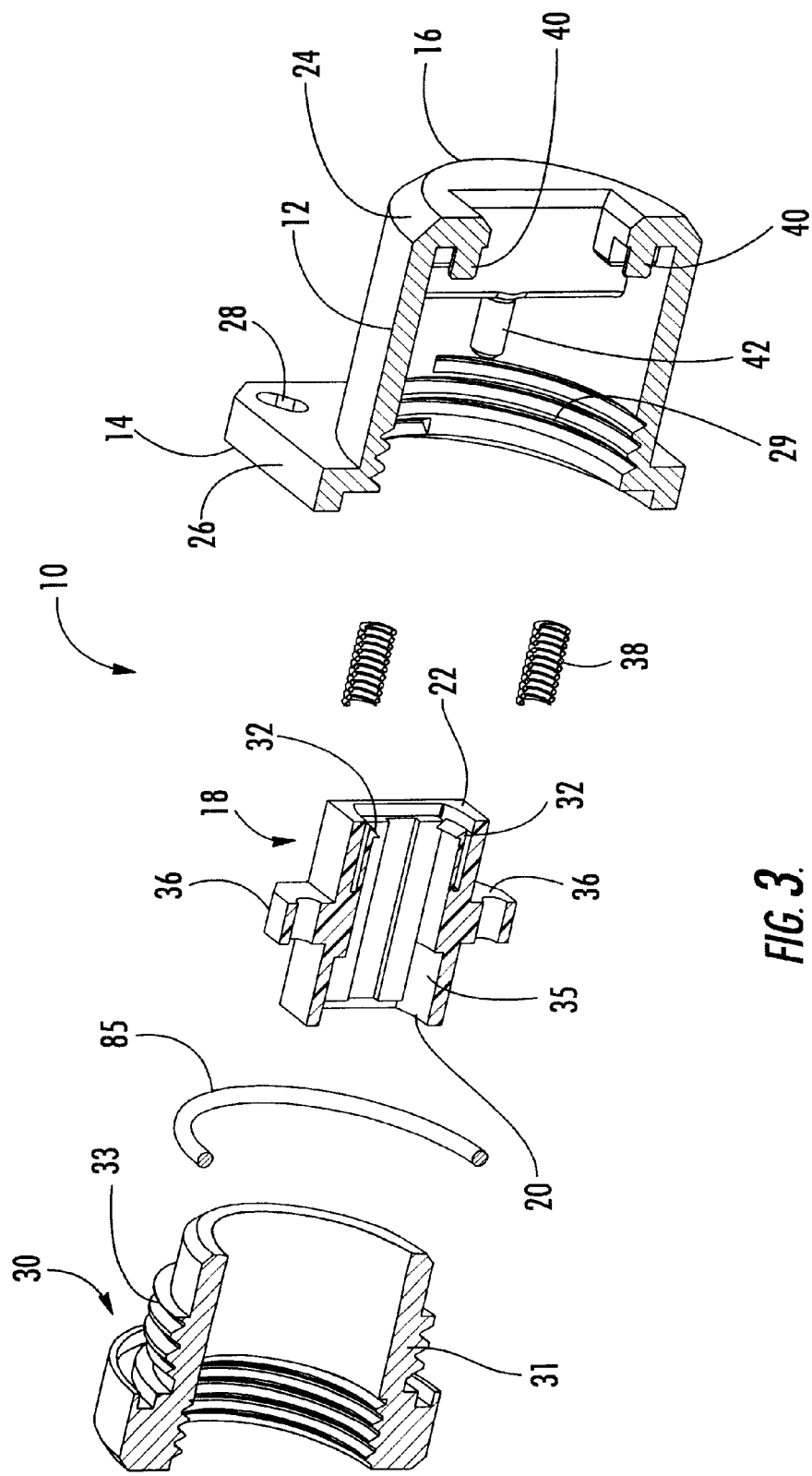
Figure 4:
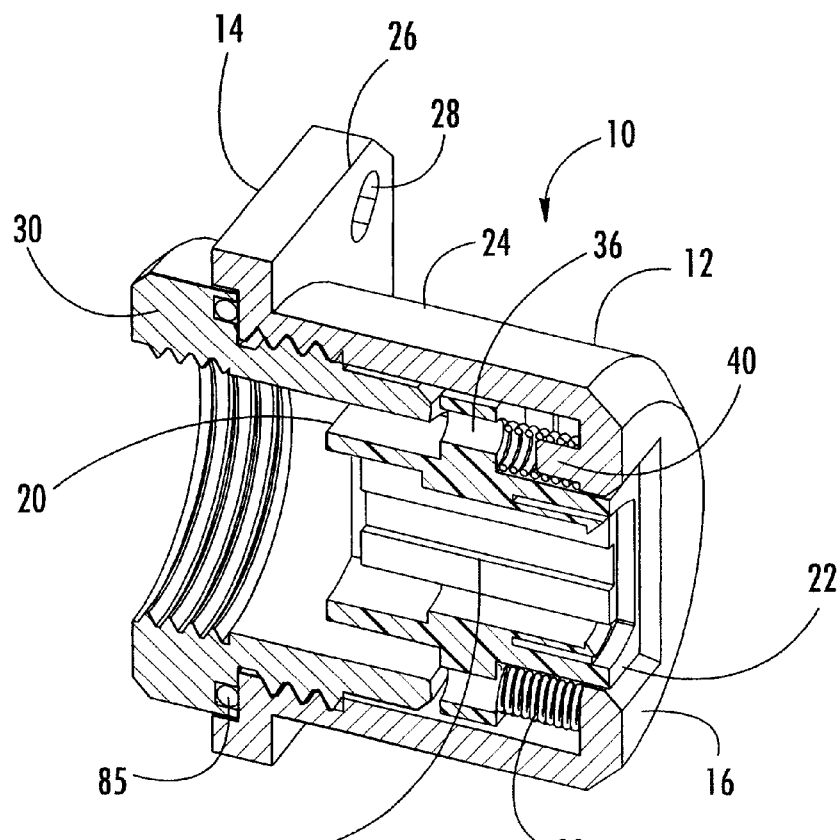
Figure 5:
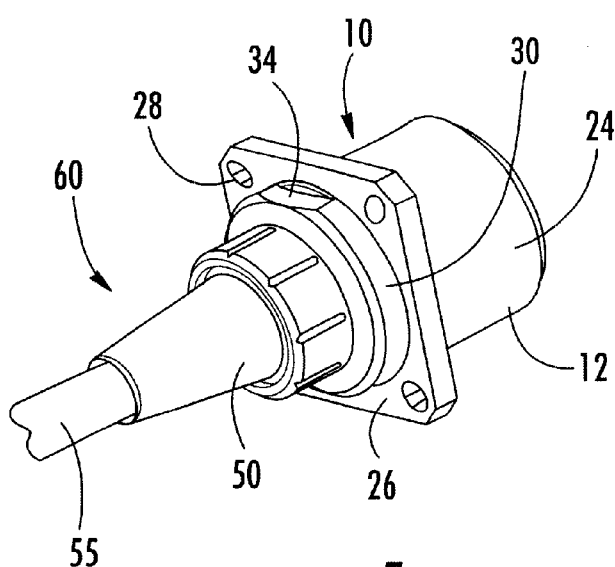
Figure 6:
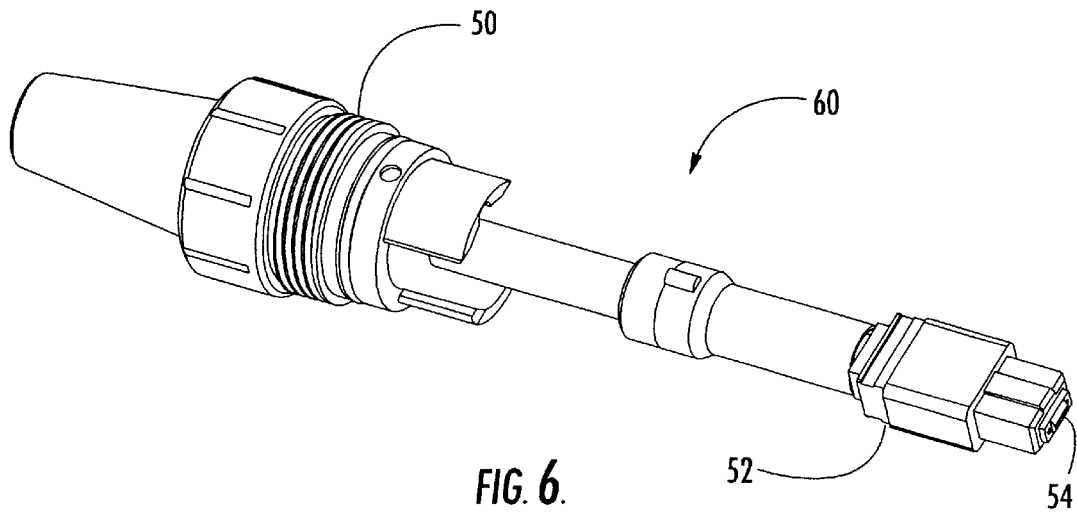
Figure 7:
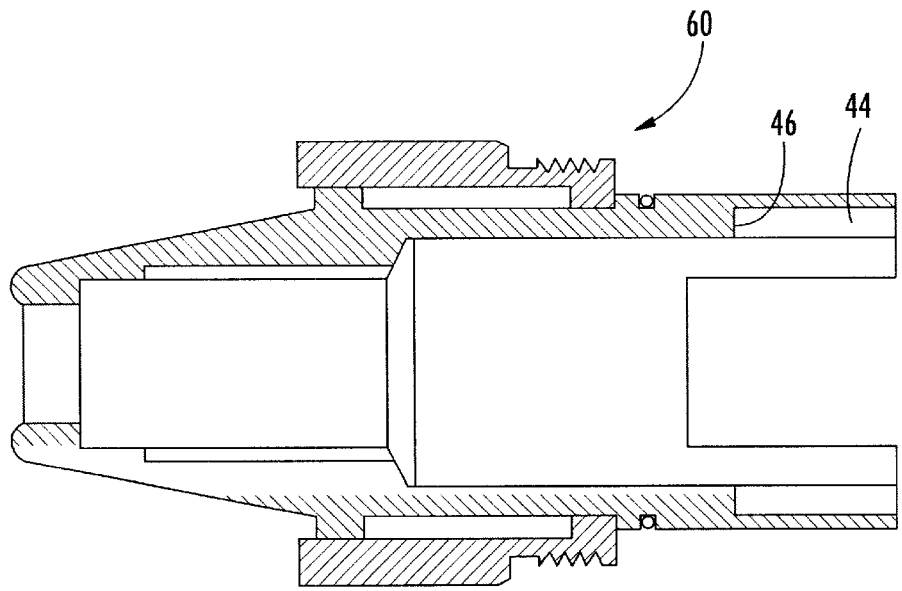

Having thus described the invention in general terms, reference will now be made to the accompanying drawings, which are not necessarily drawn to scale, and wherein:

FIG. 1 is a perspective view of an assembled fiber optic receptacle according to an embodiment of this invention;

FIG. 2 is an exploded perspective view of the fiber optic receptacle of FIG. 1;

FIG. 3 is a cross-sectional perspective view of the fiber optic receptacle of FIG. 2 taken along line 3—3;

FIG. 4 is a cross-sectional view of the fiber optic receptacle of FIG. 2 following assembly;

FIG. 5 is a perspective view of the fiber optic receptacle of FIG. 1 following mating of a fiber optic plug;

FIG. 6 is a perspective the fiber optic plug of FIG. 5;

FIG. 7 is a cross-sectional view of the plug body of the fiber optic plug of FIGS. 5 and 6; and FIG. 8 is a perspective view of a plurality of fiber optic receptacles mating or mated with a plurality of fiber optic plugs according to an embodiment of this invention.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIGS. 1, 5, and 8, an improved fiber optic receptacle 10 according to the present invention is depicted. The receptacle is typically mounted to an enclosure 80 in order to connect optical fibers outside of the enclosure with optical fibers within the enclosure. It should be understood, however, that the fiber optic receptacle can be mounted to other structures. In a preferred embodiment, the fiber optic receptacle is designed to mate with a fiber optic plug 60 mounted upon the end portion of a fiber optic cable 55. While the fiber optic receptacle can be designed to mate with a variety of different types of fiber optic plugs, the fiber optic plug described by U.S. patent application Ser. No. 09/967259 entitled Fiber Optic Plug filed concurrently herewith and commonly assigned (Attorney Docket No. HE0161) advantageously mates with the fiber optic receptacle of this invention. The contents of the patent application entitled Fiber Optic Plug are therefore incorporated by reference herein in their entirety.

As shown in FIGS. 1–3, the fiber optic receptacle 10 includes a receptacle housing 12 defining an internal cavity 13 opening through opposed ends, a first end 14 and a second end 16. Typically, the opening through the first end is relatively large so as to receive the fiber optic plug 60. Conversely, the opening through the second end 16 is typically smaller and, in one advantageous embodiment, is sized to be only slightly larger than a receptacle ferrule (not shown) such that the receptacle ferrule can be inserted through the opening while preventing other components within the receptacle 10 from being withdrawn through the opening deferred by the second end 16. The fiber optic receptacle 10 also includes an adapter sleeve 18 disposed within the internal cavity 13 defined by the receptacle housing 12. The adapter sleeve 18 has a sleeve member that defines a lengthwise extending passageway opening through opposed ends, a first end 20 and a second end 22 for receiving and aligning a plug ferrule 54 with a receptacle ferrule (not shown). In this regard, the plug ferrule of the fiber optic plug can be inserted into the first end 20 of the adapter sleeve 18, while the receptacle ferrule that is mounted upon the ends of optical fibers extending through the enclosure 80 can be inserted through the opening defined by the second end 16 of the receptacle 10 and into the second end 22 of the adapter sleeve 18.

While the receptacle housing 12 can be sized and shaped in various manners, the receptacle housing 12 of one embodiment includes a cylindrical portion 24 defining the internal cavity 13 and a flanged portion 26 proximate the first end 14 thereof. The flanged portion 26 extends laterally outward from the first end 14 of the cylindrical portion 24 of the receptacle housing 12 and defines a plurality of openings 28. Fasteners can be inserted through the openings 28 in order to connect the receptacle housing 12 to an enclosure or other structure such that the cylindrical portion 24 of the receptacle housing 12 extends through an opening defined by the enclosure. However, the receptacle housing 12 need not include the flanged portion 26 and can be formed integrally with the enclosure, if so desired.

The fiber optic receptacle 10 also preferably includes an adapter retainer 30 connected to the receptacle housing 12 proximate the first end 14 thereof. The adapter retainer 30 and the receptacle housing 12 can be connected in various manners, but, in one advantageous embodiment, the adapter retainer includes a cylindrical body 31 that is externally threaded 33, while the cylindrical portion 24 of the receptacle housing 12 is internally threaded 29. As such, the adapter retainer 30 and the receptacle housing 12 of this embodiment can be threadably engaged. While the adapter retainer 30 can be completely inset within the receptacle housing 12 once the adapter retainer 30 and the receptacle housing 12 have been threadably engaged, the adapter retainer 30 typically extends somewhat beyond the first end 14 of the receptacle housing 12. As shown in FIG. 1, the portion of the adapter retainer 30 that extends beyond the first end 14 of the receptacle housing 12 can define a pair of opposed flats 34 to facilitate engagement of the adapter retainer 30 with a wrench or the like.

As shown in FIG. 4, the adapter retainer 30 preferably engages the adapter sleeve 18 so as to retain the adapter sleeve 18 within the receptacle housing 12. In this regard, the adapter sleeve 30 is larger than the opening defined by the second end 16 of the receptacle housing 12, but smaller than the opening defined by the first end 14 of the receptacle housing. Thus, in the absence of the adapter retainer 30, the adapter sleeve 18 can be inserted and removed through the first end 14, but not the second end 16 of the receptacle housing 12. Once the adapter retainer 30 is connected to the receptacle housing 12, however, the adapter sleeve 18 is retained within the receptacle housing 12. In this regard, the adapter retainer 30 is preferably sized to be smaller in at least one lateral cross-sectional dimension than the adapter sleeve 18 so as to contact the adapter sleeve 18 and to retain the adapter sleeve 18 within the receptacle housing 12.

In the advantageous embodiment of FIGS. 2–4, the adapter sleeve 18 includes a pair of wings 36 extending laterally outward from opposed sides of the sleeve member of the adapter sleeve 18. While the wings 36 can extend laterally outward from various portions of the adapter sleeve 18, the wings 36 preferably extend laterally outward from a medial portion of the adapter sleeve 18. In this embodiment, the opening defined by the second end 16 of the receptacle housing 12 is preferably slightly larger than the sleeve member of the adapter sleeve 18 such that the second end 22 of the adapter sleeve 18 can be seated within the opening defined by the second end 16 of the receptacle housing 12. However, the wings 36 of the adapter sleeve 18 extend outwardly beyond the opening defined by the second end 16 of the receptacle housing 12 and therefore prevent the adapter sleeve 18 from being withdrawn through the opening. Additionally, the adapter retainer 30 is preferably sized to contact the wings 36 of the adapter sleeve 18 and to prevent the adapter sleeve 18 from being withdrawn through the first end 14 of the receptacle housing 12. In this regard, the cylindrical body 31 of the adapter retainer 30 defines an internal passageway extending lengthwise therethrough that is sized to receive the first end 20 of the sleeve member of the adapter sleeve 18. Thus, the first end 20 of the adapter sleeve 18 can be disposed within the cylindrical body 31 of the adapter retainer 30 with an end portion of the adapter retainer 30 contacting the wings 36 of the adapter sleeve 18.

As described in more detail below, however, the adapter retainer 30 can be removed from the fiber optic receptacle 10 in order to access the adapter sleeve 18 or to access the receptacle ferrule (not shown), such as for cleaning, replacement, or the like. In this regard, the adapter retainer 30 can be threadably disconnected from the receptacle housing 12 in order to access the adapter sleeve 18 and to remove the adapter sleeve from the fiber optic receptacle 10. Once the adapter sleeve or the receptacle ferrule has been cleaned, replaced, or the like, the adapter sleeve can be inserted into the internal cavity 13 defined by the receptacle housing and the adapter retainer can then again be connected to the receptacle housing.

The fiber optic receptacle 10 of one advantageous embodiment also includes a bias member disposed within the receptacle housing 12. The bias member operably engages the adapter sleeve 18 to urge the adapter sleeve toward the first end 14 of the receptacle housing. Typically, the bias member is one or more springs 38 positioned between the second end 16 of the receptacle housing 12 and the adapter sleeve 18 so as to urge the adapter sleeve 18 toward the first end 16 of the receptacle housing 12, as shown in FIG. 4. Thus, the adapter sleeve 18 is spring loaded. In addition to the spring loading of the adapter sleeve 18, the plug ferrule 54 of the fiber optic plug 60 that is inserted into the adapter sleeve 18 is also typically spring loaded. Thus, the spring loading of the adapter sleeve 18 and the plug ferrule urges the plug ferrule into the adapter sleeve 18. In contrast to conventional adapter sleeves, the first end 20 of the adapter sleeve 18 therefore need not include latches to mechanically engage the plug ferrule since the spring loading will maintain the plug ferrule within the adapter sleeve 18. However, the second end 22 of the adapter sleeve 18 does preferably include means for engaging the receptacle ferrule (not shown), such as, for example, a latch mechanism that includes one or more latches 32. Thus, an advantageous adapter sleeve is also provided according to an embodiment of this invention that may also be utilized in other applications that do not involve a fiber optic receptacle.

It should be understood, however, that the fiber optic receptacle 10 can include other types of bias members, in addition to or instead of one or more springs 38. Nonetheless, in the embodiments of the fiber optic receptacle 10 in which the bias member includes one or more springs 38, the receptacle housing 12 can include one or more posts 40 extending in a lengthwise direction from the second end 16 toward the first end 14. Typically, the receptacle housing 12 includes the same number of posts 40 as the number of springs 38 such that a spring can be mounted upon each respective post as shown in FIG. 4. In addition, each spring 38 is preferably longer than the respective post 40, even in the compressed state. As such, the posts 40 serve to position the springs 38 that, in turn, contact the adapter sleeve 18 and, more particularly, the wings 36 of the adapter sleeve 18. In the illustrated embodiment of the fiber optic receptacle 10 in which the adapter sleeve 18 includes a lengthwise extending sleeve member and a pair of opposed laterally extending wings 36, for example, the receptacle housing 12 preferably includes a pair of posts 40, one of which is aligned with each wing 36 of the adapter sleeve 18. Thus, each spring 38 contacts a respective wing 36 of the adapter sleeve 18 and urges the adapter sleeve 18 toward the first end 14 of the receptacle housing 12.

As described above and as shown in FIG. 5, the fiber optic receptacle 10 is adapted to receive a corresponding fiber optic plug 60 such that a plug ferrule 54 of the fiber optic plug is aligned with and inserted into the first end 20 of the adapter sleeve 18. As shown in FIG. 6 and described in more detail in the patent application entitled Fiber Optic Plug, the fiber optic plug generally includes a plug body 50 and a fiber optic connector. The fiber optic connector, in turn, includes a connector housing 52 and the plug ferrule that is at partially exposed within the connector housing. In order to facilitate the alignment of the fiber optic plug and the fiber optic receptacle and, more particularly, the alignment and optical engagement of the plug ferrule and the receptacle ferrule within the adapter sleeve of the fiber optic receptacle, either the fiber optic plug or the fiber optic receptacle can include an alignment stop, while the other of the fiber optic plug and the fiber optic receptacle can include an alignment feature. As such, the alignment stop can engage the alignment feature to ensure alignment of the fiber optic plug and the fiber optic receptacle. In addition, it would be desirable to prevent overinsertion of the fiber optic plug into the receptacle that could damage the fiber optic plug or the fiber optic receptacle or could otherwise deleteriously affect the alignment and connection of the optical fibers. Thus, the component, i.e., the fiber optic plug or the fiber optic receptacle, that includes the alignment feature can also include a stop feature for preventing overinsertion. In this regard, the alignment stop is adapted to contact the stop feature to thereby limit insertion of the fiber optic plug within the fiber optic receptacle.

In an advantageous embodiment, the alignment stop is a pin 42 that extends lengthwise, while the alignment feature is a corresponding lengthwise extending groove 44 for receiving the pin in fiber optic plug 60. Typically, the groove extends from a first open end into which the alignment stop is inserted to an opposed closed end 46. In this embodiment, the stop feature can be formed by the closed end of the groove that serves to engage the distal end of the pin in order to limit insertion of the fiber optic plug within the fiber optic receptacle 10.

In the illustrated embodiment of FIG. 3, the fiber optic receptacle 10 includes the pin 42 serving as the alignment stop. The pin has a predetermined length and extends from the second end 16 or a medial portion of the receptacle housing 12 to an opposed distal end proximate the first end 14. In this embodiment, the plug body of the fiber optic plug 40 defines a corresponding groove 44 for receiving the pin, as shown in FIG. 7. As described above, the groove extends from an open first end proximate the end of the fiber optic plug 60 that is initially inserted into the fiber optic receptacle to an opposed closed end 46. Thus, the groove defined by the plug body of the fiber optic plug extends in a lengthwise direction between the opposed first end and second end such that the pin can move through the groove from the first end of the groove toward the second end as the fiber optic plug is inserted into the fiber optic receptacle. Once the fiber optic plug has been sufficiently inserted into the fiber optic receptacle such that the plug ferrule 54 of the fiber optic plug has been fully inserted into the first end of the adapter sleeve 18. Further insertion of the fiber optic plug into the fiber optic receptacle will cause the pin to contact the closed end of the groove defined by the plug body so as to prevent further insertion of the fiber optic plug, thereby protecting the fiber optic plug and the fiber optic receptacle and avoiding any deleterious effects upon the alignment and connection of the optical fibers within the adapter sleeve. While the pin that serves as the alignment stop can be disposed in various positions within the fiber optic receptacle, the pin typically extends alongside at least a portion of the adapter sleeve 18. Thus, the fiber optic plug and the fiber optic receptacle of this embodiment can be reliably aligned during the insertion of the fiber optic plug into the fiber optic receptacle 10, while preventing overinsertion of the fiber optic plug 60 within the fiber optic receptacle 10.

Either before or after the fiber optic plug 40 is inserted into the fiber optic receptacle 10, a receptacle ferrule (not shown) that is mounted upon the optical fibers that typically extend through the enclosure is inserted into the second end 22 of the adapter sleeve 18. Thus, the adapter sleeve serves to align the plug ferrule 54 of the fiber optic plug that is inserted into the first end 20 of the adapter sleeve with the receptacle ferrule inserted into the second end of the adapter. As such, the optical fibers upon which the respective ferrules are mounted are correspondingly aligned and optically interconnected.

According to another embodiment of this invention, the adapter retainer 30 and the receptacle housing 12 cooperate to define an internal cavity that is sized to receive any of a variety of different types of adapter sleeves 18. In this regard, a different adapter sleeve is typically required to connect each of the different types of fiber optic connectors since each type of fiber optic connector has its own unique size, shape, and sometimes latching mechanism that, in turn, must be matched by the size, shape, and latching mechanism of the internal passageway defined by the adapter sleeve. According to this embodiment of this invention, however, the adapter retainer 30 and the receptacle housing 12 cooperate to define an internal cavity that is sized to receive any adapter sleeve 18, such as, for example, adapter sleeves configured to receive a plurality of connector types including MTP, MTRJ, SC-DC, SC, DC, Unicam™, LC, and the like. According to this embodiment, the adapter sleeve 18 of the fiber optic receptacle is configured to receive a plurality of connector types including MTP, MTRJ, SC-DC, SC, DC, Unicam™, LC, and the like. Thus, the fiber optic receptacle 10 of this embodiment serves as a universal receptacle since the receptacle may be readily configured to receive and align any of a variety of different types of fiber optic connectors. In this regard, the adapter retainer 30 is typically capable of being disconnected from the receptacle housing 12, such as by being threadably disconnected from the receptacle housing, in order to access the adapter sleeve 18. As such, one type of adapter sleeve 18 can be removed and replaced with another type of adapter sleeve 18 and the adapter retainer can then again be connected to the receptacle housing 12. The same receptacle can therefore receive, align and interconnect different types of fiber optic connectors depending upon the adapter sleeve disposed there within. Thus, the universal fiber optic receptacle of this embodiment reduces the number of receptacles that must be maintained in inventory and carried by a technician, while still permitting a number of different types of fiber optic connectors to be interconnected.

In an other embodiment, the fiber optic receptacle 10 may further include sealing means for preventing moisture and other forms of environmental degradation from entering the adapter retainer 30 engaged with the receptacle housing 12. In an advantageous embodiment, the sealing means comprise a sealing ring 85 placed between the receptacle housing and the adapter retainer.

Referring now to FIG. 8, a plurality of fiber optic plugs 60 are shown mating or mated with a plurality of fiber optic receptacles 10 that are affixed to an enclosure 80 such that the optical fibers extending from a front face of the plug ferrule (not shown) may be aligned with and optically interconnected with optical fibers extending from a front face of the receptacle ferrule (not shown) within the enclosure.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A fiber optic receptacle comprising:
a receptacle housing defining an internal cavity opening through opposed first end and second end, the receptacle housing adapted to mate with a corresponding fiber optic plug;
an adapter sleeve disposed within the internal cavity defined by the receptacle housing, the adapter sleeve defining a lengthwise extending passage opening through opposed first end and second end for receiving and aligning a receptacle ferrule and a plug ferrule; and
a bias member disposed within the receptacle housing, the bias member operably engaging the adapter sleeve so as to urge the adapter sleeve towards the first end of the receptacle housing, whereby the bias member is configured to floatingly align the receptacle ferrule with the plug ferrule engaged in the adapter sleeve.

2. The fiber optic receptacle according to claim 1, wherein the bias member comprises at least one spring disposed between the second end of the receptacle housing and the adapter sleeve.

3. The fiber optic receptacle according to claim 2, wherein the receptacle housing comprises at least one post extending in a lengthwise direction from an interior surface of the second end towards the first end, wherein each of the at least one spring is mounted upon a respective at least one post.

4. The fiber optic receptacle according to claim 1, wherein the adapter sleeve further comprises:
a lengthwise longitudinally extending sleeve member; and
a pair of wings extending from opposite sides of the sleeve member;
wherein the pair of wings are engaged byte bias member to urge the adapter sleeve toward the first end of the receptacle housing.

5. The fiber optic receptacle according to claim 1, further comprising:
an adapter retainer comprising opposed first end and second end, wherein the first end of the adapter retainer is adapted to receive a plug body of a fiber optic connector comprising the plug ferrule and wherein the adapter retainer is configured to engage with the adapter sleeve so as to retain the adapter sleeve within the receptacle housing; and
sealing means for preventing moisture and other forms of environmental degradation from entering the adapter retainer engaged with the receptacle housing.

6. The fiber optic receptacle according to claim 5, wherein an interior surface of the first end of the receptacle housing is further configured to engage an exterior surface of the second end of the adapter retainer such that the adapter sleeve is secured between the receptacle housing and the adapter retainer.

7. The fiber optic receptacle according to claim 6, wherein the sealing means comprise a sealing ring placed between the receptacle housing and the adapter retainer.

8. The fiber optic receptacle according to claim 1, further comprising:
an alignment stop disposed in a fixed position upon the receptacle housing, wherein the alignment stop is adapted to engage an alignment feature of a corresponding fiber optic plug to assent alignment of the fiber optic plug with the fiber optic receptacle and wherein the alignment stop is also adapted to contact a stop feature of the fiber optic plug to thereby limit insertion of the fiber optic plug within the fiber optic receptacle.

9. The fiber optic receptacle according to claim 8, wherein the alignment stop further comprises a lengthwise extending pin for engaging a corresponding groove defined by the fiber optic plug.

10. The fiber optic receptacle according to claim 9, wherein the pin has a proximal end connected to the second end of the receptacle housing and an opposed distal end, wherein the pin has a predetermined length, and wherein the distal end of the pin is adapted to contact an end of the corresponding groove defined by the fiber optic plug to limit insertion of the fiber optic plug within the fiber optic receptacle.

11. The fiber optic receptacle according to claim 10, wherein the pin extends alongside at least a portion of the adapter sleeve.

12. The fiber optic receptacle according to claim 1, further comprising:
torsion coupling means for providing torsion relief between a fiber optic cable connected to the receptacle housing, wherein the fiber optic cable comprises a fiber optic plug end and wherein the fiber optic plug end comprises a connector comprising the plug ferrule, the plug ferrule capable of engaging the first end of the adapter sleeve.

13. The fiber optic receptacle according to claim 12, wherein the torsion coupling means comprises at least one torsion coupling pin that couples the fiber optic plug to the fiber optic receptacle.

14. The fiber optic receptacle according to claim 12, wherein the torsion coupling means comprises a key disposed along an exterior surface of the fiber optic plug and a keyway disposed along an interior surface of the first end of the adapter retainer, such that torque applied to the fiber optic cable is transmitted from the fiber optic cable to the fiber optic plug to the fiber optic receptacle thereby providing torque relief for the adapter sleeve and the connector.

15. The fiber optic receptacle of claim 5, wherein the interior surface of the first end of the receptacle housing is threadably configured to engage the exterior surface of the second end of the adapter retainer such that the adapter retainer is capable of being disconnected from the receptacle housing in order to access the adapter sleeve and to access the receptacle ferrule.

16. A fiber optic receptacle comprising:
a receptacle housing defining an internal cavity opening through opposed first and second ends, the receptacle housing adapted to mate with a corresponding fiber optic plug;
an adapter sleeve floatingly disposed within the internal cavity defined by the receptacle housing, the adapter sleeve defining a lengthwise extending passage opening through opposed first and second ends for receiving and aligning respective ferrules; and
an alignment stop disposed in a fixed position within the receptacle housing, the alignment stop adapted to engage an alignment feature of the corresponding fiber optic plug to insure alignment of the fiber optic plug with the fiber optic receptacle, the alignment stop also adapted to contact a stop feature of the fiber optic plug to thereby limit insertion of the fiber optic plug within the fiber optic receptacle.

17. The fiber optic receptacle according to claim 16, further comprising a bias member disposed within the receptacle housing, the bias member operably engaging the adapter sleeve so as to urge the adapter sleeve toward the first end of the receptacle housing.

18. The fiber optic receptacle according to claim 17, wherein the bias member comprises at least one spring disposed between the second end of the receptacle housing and the adapter sleeve.

19. The fiber optic receptacle according to claim 18, wherein the receptacle housing comprises at least one post extending in a lengthwise direction from the second end, wherein each spring is mounted upon a respective post.

20. The fiber optic receptacle according to claim 17, wherein the adapter sleeve comprises:
   a lengthwise extending sleeve member; and
   a pair of wings extending from opposite sides of the sleeve member, wherein the pair of wings are engaged by the bias member to urge the adapter sleeve toward the first end of the receptacle housing.

21. The fiber optic receptacle according to claim 17, further comprising an adapter retainer connected to the receptacle housing proximate the first end thereof, the adapter retainer engaging the adapter sleeve so as to retain the adapter sleeve within the receptacle housing.

22. A fiber optic plug and receptacle assembly comprising:
   a fiber optic plug comprising:
      a plug body; and
      a fiber optic connector disposed within the plug body and comprising a connector housing and a ferrule at least partially disposed within the connector housing; and
   a fiber optic receptacle for mating with the fiber optic plug, the fiber optic receptacle comprising:
      a receptacle housing defining an internal cavity opening through opposed first and second ends; and
      an adapter sleeve floatingly disposed within the internal cavity defined by the receptacle housing, the adapter sleeve defining a lengthwise extending passage for receiving a portion of the ferrule of the fiber optic plug
   wherein one of the fiber optic plug and the fiber optic receptacle comprises an alignment stop and the other of the fiber optic plug and the fiber optic receptacle comprises an alignment feature and a stop feature, wherein the alignment stop engages the alignment feature to insure alignment of the fiber optic plug and the fiber optic receptacle, and wherein the alignment stop is also adapted to contact the stop feature to thereby limit insertion of the fiber optic plug within the fiber optic receptacle.

23. A fiber optic plug and receptacle assembly according to claim 22, wherein the alignment stop comprises a pin, the alignment feature comprises a groove, and the stop feature comprises a closed end of the groove for engaging a distal end of the pin.

24. A fiber optic plug and receptacle assembly according to claim 23, wherein the fiber optic receptacle comprises the pin having a predetermined length and extending from a proximal end connected to the second end of the receptacle housing to the opposed distal end, wherein the plug body of the fiber optic plug defines the groove for receiving the pin.

25. A fiber optic plug and receptacle assembly according to claim 24, wherein the plug body of the fiber optic plug includes a first end adapted to be inserted into the fiber optic receptacle, wherein both the pin and the corresponding groove extend in a lengthwise direction, and wherein the groove defined by the plug body extends from an open end proximate the first end of the plug body to an opposed closed end that serves as the stop feature.

26. A fiber optic plug and receptacle assembly according to claim 24, wherein the pin extends alongside at least a portion of the adapter sleeve.

27. A fiber optic plug and receptacle assembly according to claim 22, wherein the fiber optic receptacle further comprises a bias member disposed within the receptacle housing, the bias member operably engaging the adapter sleeve so as to urge the adapter sleeve toward the first end of the receptacle housing.

28. A fiber optic plug and receptacle assembly according to claim 27, wherein the adapter sleeve comprises:
   a lengthwise extending sleeve member; and
   a pair of wings extending from opposite sides of the sleeve member, wherein the pair of wings are engaged by the bias member to urge the adapter sleeve toward the first end of the receptacle housing.

29. A fiber optic plug and receptacle assembly according to claim 22, wherein the fiber optic receptacle further comprises an adapter retainer connected to the receptacle housing proximate the first end thereof, the adapter retainer engaging the adapter sleeve so as to retain the adapter sleeve within the receptacle housing, the adapter retainer also engaging the plug body of the fiber optic plug.

30. A universal fiber optic receptacle comprising:
   a receptacle housing extending lengthwise between opposed first end and second end;
   an adapter retainer connected to the receptacle housing proximate the first end thereof, the adapter retainer and the receptacle housing cooperating to define an internal cavity sized to receive any one of an adapter sleeve selected from a group comprising an MTP adapter sleeve, an SC adapter sleeve, an MTRJ adapter sleeve, an LC adapter sleeve, a Unicam adapter sleeve, a DC adapter sleeve, and an SC-DC adapter sleeve; and
   an adapter sleeve disposed within the internal cavity defined by the adapter retainer and the receptacle housing, the adapter sleeve selected from the group comprising an MTP adapter sleeve, an SC adapter sleeve, an MTRJ adapter sleeve, an LC adapter sleeve, a Unicam adapter sleeve, a DC adapter sleeve, and an SC-DC adapter sleeve, the adapter sleeve defining a lengthwise extending passage opening through opposed first and second ends for receiving and floatingly aligning a front face of a plug ferrule with a front face of a receptacle ferrule.

31. A universal fiber optic receptacle according to claim 30, wherein the adapter retainer is threadably connected to the receptacle housing such that the adapter retainer is capable of being disconnected from the receptacle housing in order to access the adapter sleeve.

32. An adapter sleeve for a fiber optic receptacle comprising;
   a sleeve member extending lengthwise between a first end and a second end, the sleeve member defining an internal passageway extending between the first and second ends and sized to permit a plug ferrule and a receptacle ferrule to be inserted into the sleeve member in an aligned relationship via the first end and second end, respectively; and a latch mechanism proximate the second end of the sleeve member for mechanically engaging the receptacle ferrule, wherein the first end of the sleeve member is free of any latch mechanism.

33. An adapter sleeve according to claim 32, wherein the latch mechanism comprises a pair of latches proximate the second end of the sleeve member for engaging the receptacle ferrule.

* * * * *